Aug. 4, 1953

A. E. FLEMMING 2,647,792

CLOSURE SEAL OF CANTILEVER TYPE FOR
VEHICLE BODIES AND THE LIKE
Filed Oct. 25, 1950

INVENTOR.
Albert E. Flemming.
BY
Harness and Harris
ATTORNEYS.

Patented Aug. 4, 1953

2,647,792

UNITED STATES PATENT OFFICE 2,647,792

CLOSURE SEAL OF CANTILEVER TYPE FOR VEHICLE BODIES AND THE LIKE

Albert E. Flemming, Birmingham, Mich., assignor to Chrysler Corporation, Highland Park, Mich., a corporation of Delaware Application October 25, 1950, Serial No. 192,080

8 Claims. (Cl. 296—76)

This invention relates to closure seals and has particular reference to automobile body deck lid and door seal constructions. The cantilever type seal herein disclosed provides an efficient, durable seal that is economical and easy to manufacture and install and is designed such that it effectively cushions the closing of the body closure member, eliminates the possibility of rattles between the closure member and its supporting frame work and insures a substantially airtight, watertight seal around the entire perimeter of the closure member. The necessity for improved seals around motor vehicle body doors and deck lids has become of increasing importance due not only to the desire to eliminate leaks and drafts within the vehicle, but also due to the fact that airtight interiors are essential for vehicles having interior heating and so-called air conditioning equipment associated therewith.

In the past it has been quite common to use compression-type sealing strips between the marginal flanges of the hinged vehicle body closure members and the supporting framework for the closure members. Some of the disadvantages of the compression-type seals are that they interfere with and provide a hard closing action, they do not provide the most efficient seal, for often they seal only at the high points and fail to seal at the low points along the seal, and they require a more rugged and more expensive type of seal in order to withstand the destructive compressive forces that are set-up during closure member closing action.

In an effort to overcome the disadvantages of the compression-type of seal, resilient, cantilever-type seals have been proposed. The cantilever-type of seal is designed to have the pivotally supported, resilient, sealing finger bent into sealing engagement with either the supporting framework or the closure member to thus tension the sealing finger against either the framework or the closure member depending on which member carries the seal. This bending of the pivotally mounted sealing finger against an associated frame member provides a soft door closing action and insures an efficient seal at all points along the sealing joint. By using a cantilever-type seal it is possible to secure an airtight, watertight seal along the entire sealing joint, regardless of the variations in clearance along the sealing joint and, furthermore, a less rugged, cheaper type of seal may be used due to the fact that the sealing strip is not required to withstand destructive compression forces but is merely bent or tensioned against the associated frame member.

One of the problems associated with the use of resilient sealing strips of the cantilever type is that of effectively securing the sealing strip to its supporting member by an easy, economical method that is particularly adapted for current high speed production line use. It has been more or less conventional practice to secure these sealing strips to their supporting members by the use of either cement or clip connectors or a combination of both means. Both of these types of seal anchoring connections have been relatively costly, time and labor consuming, and neither method has insured an effective, durable adhesion of the seal to its supporting member.

It has been found that as the sealing finger of a resilient, cantilever-type sealing strip is bent into sealing engagement with the member against which it seals that the base portion of the sealing strip adjacent its connection to the sealing finger becomes highly stressed. This stressing of the base portion of the sealing strip is transmitted to the connection between the seal and its supporting member and tends to tear the base of the sealing strip away from the seal supporting member. If the sealing strips are connected to the supporting frame work by a cement this constant stressing of the cemented connection between the sealing strip and the supporting member is quite detrimental to the life of the bond. If separate clip connectors are used to connect the sealing strip and its supporting member then this stressing of the sealing strip during flexing of the seal has a tendency to tear the sealing strip away from the clip.

The invention herein disclosed and claimed is designed to provide an improved cantilever-type of resilient seal that may be easily and effectively secured to a more or less conventionally formed supporting member with a minimum of labor and without the use of cement or resilient clip connectors or the like.

It is a primary object of this invention to provide a cantilever-type of resilient seal that includes portions adapted to assist in the anchoring of the seal to its supporting member during sealing action.

It is another object of this invention to provide a resilient, cantilever-type, seal and a grooved supporting member therefor wherein the seal has movable portions adapted to be bent into engagement with the seal base portion during sealing action so as to assist in anchoring the seal in the grooved supporting member.

It is another object of this invention to provide a cantilever-type resilient sealing strip having the base portion and the sealing finger mounted thereon formed such that the strip will be wedgingly maintained in its assembled position after initial installation without the use of cement, clip connectors or the like.

Other objects and advantages of this invention will be readily apparent from a reading of the following description and a consideration of the relating drawings, wherein.

Figure 1:
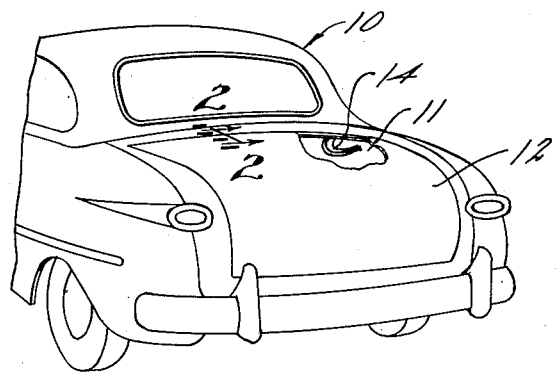
Fig. 1 is a perspective view of the rear portion of an automobile body that includes a hingedly mounted rear deck lid or luggage compartment cover.

Fig. 1 of the drawings shows the rear end of an automobile body 10 that includes a rearwardly extending luggage compartment 11. Compartment 11 has a deck lid or cover 12 hingedly connected to the body 10 by hinge means 14 that permit the lid 12 to be swung upwardly and forwardly to permit one to gain access to the compartment 11.

The opening in the body 10 (see Fig. 2) that receives the deck lid closure member 12 has the periphery thereof formed to provide a depressed, substantially L-shaped channel or groove 16. Groove 16 is adapted to receive a resilient, cantilever-type, sealing strip 30. The groove or channel 16 is formed by the L-shaped body flange 21 that has secured thereto by welds 22 or the like, the substantially U-shaped channel member 24. Channel 24 has an inwardly bent edge flange 25 that provides a seat to receive a preformed portion 31a of the base portion 31 of the seal 30. Seal 30 is of some resilient material such as rubber or like material.

Seal 30 comprises the strip-like base portion 31 that is tapered in cross sectional configuration. The forward or thicker side 31a of the base portion 31 is formed with a ledge-like formation 32 that is adapted to be matingly and wedgingly engaged with the flange 25 of the channel member 24. The rear or thinner side 31b of the base portion 31 is shaped to be quite flexible and is adapted to be bent into engagement with the walls of the channel member 24. The seal base portion 31, adjacent the forward or thicker portion 31a, has a substantially V-shaped flap member 33 hingedly or pivotally connected thereto by the reduced neck portion 34. Flap 33 includes the sealing finger or leg 35 that is adapted to be bent into sealing engagement with the underside of the peripheral flange portion 41 of the deck lid 12. Flap 33 of seal 30 also includes the anchor leg portion 36 that is adapted to be bent into engagement with the seal base portion 31 when the lid flange portion 41 is moved into sealing engagement with the sealing leg 35.

Figure 2:
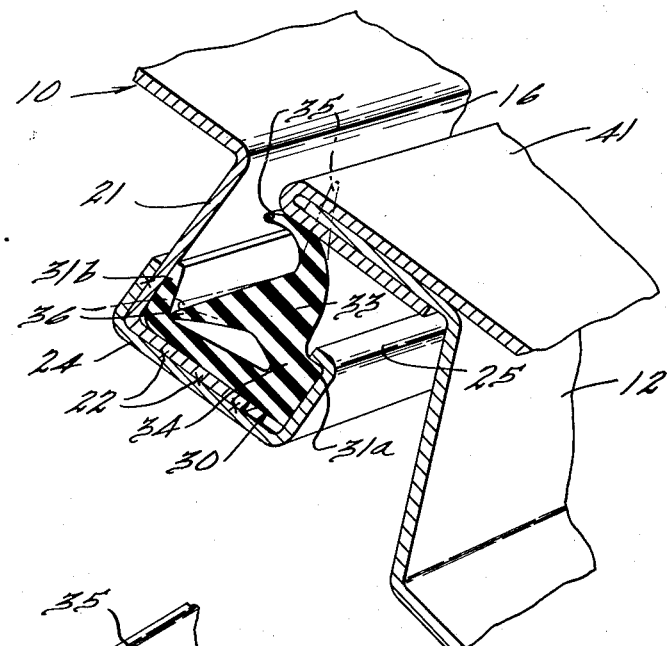
Fig. 2 is a fragmentary sectional elevational view taken along the line 2—2 of Fig. 1.
Figure 3:
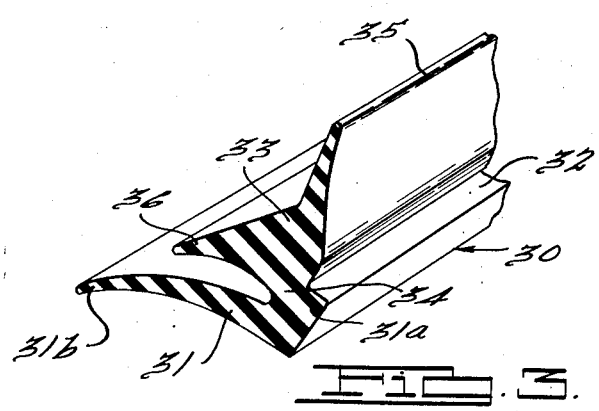
Fig. 3 is a perspective view of an end portion of a resilient, cantilever-type, sealing strip formed in accordance with this invention.

The broken lines in Fig. 2 show the relative positions of the sealing leg 35 and the anchor leg 36 prior to engagement of the lid flange 41 with the sealing leg 35. Leg 35 is normally perpendicular to the base portion 31 while leg 36 overlies the base portion 31. As the lid flange 41 is moved into engagement with sealing leg 35 the entire seal flap portion 33 is bent rearwardly or backwardly about the seal neck portion 34 and the anchor leg 36 is forced downwardly into engagement with the rear end portion 31b of the seal base portion 31. Anchor leg 36 thus operates to positively hold the seal base portion 31b in engagement with the body supporting flange 21 that extends around the edge of the lid receiving opening in the body 10. As a result of the action of pivoted anchor leg 36 the base portion 31 of seal 30 is maintained in the channel-like seal receiving groove 16 at all times and cement or clip-like connectors are not required to anchor the seal 30 in the groove 16.

To install the seal 30 in the groove 16 the angular forward edge portion 31a of the seal base portion 31 is first inserted beneath the reversely bent flange 25 of the channel member 24. The rear edge portion 31b of the seal base portion 31 is then forced downwardly into the groove 16 so that forwardly disposed base portion 31a is wedged into the space beneath flange 25. At the same time the rear edge portion 31b of base portion 31 is bent into conformance with the shape of the groove 16. The elasticity of the sealing strip base portion 31 is such that the bent rear end 31b thereof wedgingly holds the base portion 31 in contacting engagement with the adjacent walls of the channel-like groove 16.

It is thought to be obvious from the foregoing description that the seal construction herein disclosed operates to securely anchor the seal in position during sealing action and to provide adequate means for holding the seal in its receiving groove at all times without the use of cement, anchor clips, or the like.

I claim:

1. In combination, a motor vehicle body having an opening therein and a closure member for said opening hingedly connected to said body, said body having a depressed, channel-like, groove formed therein to extend around the periphery of the opening, said groove being adapted to receive portions of said closure member in spaced, superimposed relation thereto, and a resilient seal having a strip-like base portion wedgingly mounted in said groove and an outwardly projecting flap portion of substantially V-shaped cross sectional configuration hingedly connected to said base portion, said V-shaped flap portion comprising a cantilever-type sealing leg adapted to be sealingly engaged with the said portions of the closure member and an angularly spaced anchor leg adapted to normally overlie and to be bent into engagement with said base portion during sealing engagement of said sealing leg with the said superimposed portions of said closure member.

2. A resilient seal comprising a strip-like base portion of substantially rectangular cross-section having a longitudinally extending flap portion of substantially V-shaped cross sectional configuration hingedly connected to said base portion and extending along one side thereof by a neck portion, said flap portion comprising a first sealing leg that normally extends substantially perpendicular to said base portion and a second anchor leg projecting from said base portion and angularly spaced from said sealing leg, said anchor leg being arranged to normally overlie said base portion and to be bendable into engagement with said base portion upon pivotal movement of said sealing leg towards said base portion.

3. In combination, a motor vehicle body having an opening therein and a closure member therefor hingedly connected to said body, said body having a depressed, channel-like, groove formation therein extending around the periphery of the opening adapted to receive peripheral portions of said closure member in overlying, spaced, relation thereto, said body being formed with a flange portion that overlies a portion of the groove along one side thereof, and a resilient seal having a strip-like base portion wedgingly mounted in said groove, said strip base portion having a formation along one side thereof adapted to engage said body flange portion to anchor said strip base portion in said channel groove, and an outwardly projecting flap portion of substantially V-shaped cross sectional configuration hingedly connected to said base portion by a reduced neck portion, said flap portion comprising a sealing leg normally disposed substantially perpendicular to said base portion and adapted to be bent towards said base portion during sealing engagement with the said peripheral portions of the closure member, and an anchor leg angularly spaced from said sealing leg and positioned to normally overlie said base portion, said anchor leg being adapted to be bent into engagement with said base portion during engagement of said sealing leg with the said peripheral portions of said closure member.

4. A resilient seal comprising a strip-like base portion having in cross sectional configuration a cross-wise taper with a step-like formation adjacent the thicker side thereof, and a longitudinally extending flap member of substantially V-shaped cross sectional configuration having the vertex portion thereof pivotally connected to said base portion adjacent said step-like formation by a neck-like hinge portion, one of the legs of said V-shaped flap member being normally disposed substantially perpendicular to said base portion and adapted to be sealingly engaged with a member positioned adjacent thereto, and the other leg of said V-shaped flap member being normally disposed to overlie said base portion and to be bent into engagement with said base portion when said one leg is engaged with said member.

5. A resilient seal comprising a strip-like base portion having in cross sectional configuration a cross-wise taper with a step-like formation adjacent the thicker side thereof, and a longitudinally extending flap member of substantially V-shaped cross sectional configuration having the vertex portion thereof pivotally connected to said base portion adjacent said step-like formation by a relatively thin neck portion, one of the legs of said V-shaped flap member being normally disposed substantially perpendicular to said base portion and adapted to be sealingly engaged with a member pressed thereagainst, and the other leg of said V-shaped flap member being normally disposed to overlie said base portion, said other leg being adapted to be pivotally bent into engagement with said base portion when said one leg is pivoted towards said base portion during sealing engagement with said member.

6. In a structure having an opening therein and a closure member therefor hingedly connected to said structure, a channel-like formation in said structure extending about the periphery of said opening, a resilient seal having a base portion wedgingly mounted within said channel-like formation, said base portion having a longitudinally extending flap member or V-shaped cross-sectional configuration pivotally connected thereto by the vertex portion of the V-shaped flap member by a reduced neck portion, one of the legs of said V-shaped flap member being positioned to normally overlie said base portion and the other of the legs of said flap member, that is adapted to be sealingly engaged with said closure member, normally extending substantially perpendicular to said base portion, pivotal movement of said other leg of the flap member towards said base portion upon engagement with said closure member effecting engagement of said one leg of the flap member with said base portion to press said base portion into said channel-like formation.

7. In a structure having an opening therein and a closure member therefor hingedly connected to said structure, a channel-like formation in said structure extending about the periphery of said opening having a reversely bent flange overlying a portion of said channel opening, a resilient seal having a strip-like base portion wedgingly mounted within said channel-like formation, said base portion having a ledge-like formation engageable with said flange around said opening, said base portion having a longitudinally extending flap member of V-shaped cross-sectional configuration pivotally connected thereto, said V-shaped flap member, having its vertex portion pivotally connected to the base member adjacent the ledge-like formation on said base member, one of the legs of said V-shaped flap member being positioned to normally overlie said base portion and the other of the legs of said flap member normally extending substantially perpendicular to said base portion and arranged to be pivoted towards said base portion when sealingly engaged with said closure member, pivotal movement of said other leg of the flap member towards said base portion upon engagement with said closure member effecting engagement of said one leg of the flap member with said base portion to wedge said base portion in said channel-like formation.

8. A resilient seal comprising a strip-like base portion having a longitudinally extending flap portion of V-shaped cross-sectional configuration hingedly connected by the vertex portion of said flap portion to said base portion adjacent one edge thereof, said V-shaped flap portion overlying said base portion and comprising a first sealing leg that normally extends substantially perpendicular to said base portion and a second anchor leg angularly disposed with respect to said sealing leg, said anchor leg being arranged to normally overlie said base portion and to be bent into engagement with said base portion upon pivotal movement of said sealing leg towards said base portion upon engagement of said sealing leg with a member to be sealed.

ALBERT E. FLEMMING.

References Cited in the file of this patent

UNITED STATES PATENTS

| Number | Name | Date |
| --- | --- | --- |
| 1,763,603 | Donahue | June 10, 1930 |
| 2,122,608 | Harlow | July 5, 1938 |
| 2,267,433 | Tea | Dec. 23, 1941 |
| 2,329,791 | Sevison | Sept. 21, 1943 |
| 2,345,273 | Macklanburg | Mar. 28, 1944 |
| 2,528,264 | Coppock et al. | Oct. 31, 1950 |
| 2,591,833 | Kreimendahl | Apr. 8, 1952 |

FOREIGN PATENTS

| Number | Country | Date |
| --- | --- | --- |
| 293,194 | Great Britain | July 5, 1928 |
| 581,038 | Germany | July 20, 1933 |